US007638899B2

(12) United States Patent
Tracy et al.

(10) Patent No.: US 7,638,899 B2
(45) Date of Patent: Dec. 29, 2009

(54) NESTED REDUNDANT UNINTERRUPTIBLE POWER SUPPLY APPARATUS AND METHODS

(75) Inventors: John G. Tracy, Hendersonville, NC (US); Frederick Tassitino, Jr., Wake Forest, NC (US)

(73) Assignee: Eaton Corporation, Cleveland, OH (US)

( * ) Notice: Subject to any disclaimer, the term of this patent is extended or adjusted under 35 U.S.C. 154(b) by 435 days.

(21) Appl. No.: 11/561,663

(22) Filed: Nov. 20, 2006

(65) Prior Publication Data

US 2007/0210652 A1  Sep. 13, 2007

Related U.S. Application Data

(60) Provisional application No. 60/781,102, filed on Mar. 10, 2006.

(51) Int. Cl.
*H02J 9/00* (2006.01)
(52) U.S. Cl. .......................................... 307/65; 307/64
(58) Field of Classification Search .............. 307/64–66
See application file for complete search history.

(56) References Cited

U.S. PATENT DOCUMENTS

| 4,104,539 | A | 8/1978 | Hase |
| 5,745,355 | A | 4/1998 | Tracy et al. |
| 5,745,356 | A | 4/1998 | Tassitino, Jr. et al. |
| 5,745,357 | A | 4/1998 | Matsumoto |
| 6,118,680 | A | 9/2000 | Wallace et al. |
| 6,292,379 | B1 * | 9/2001 | Edevold et al. ............... 307/66 |
| 6,549,440 | B2 | 4/2003 | Tassitino, Jr. et al. |
| 6,629,247 | B1 * | 9/2003 | Hall et al. ..................... 307/66 |
| 6,803,679 | B1 | 10/2004 | Luo et al. |
| 2004/0070279 | A1 * | 4/2004 | Liu et al. ...................... 307/64 |
| 2005/0073783 | A1 | 4/2005 | Luo et al. |
| 2005/0162792 | A1 | 7/2005 | Wang et al. |
| 2006/0167569 | A1 * | 7/2006 | Colombi et al. ............... 700/22 |

* cited by examiner

*Primary Examiner*—Fritz M Fleming
(74) *Attorney, Agent, or Firm*—Myers Bigel Sibley & Sajovec, P.A.

(57) ABSTRACT

An uninterruptible power supply (UPS) system includes at least three UPSs configured to be connected in parallel to a common load. The system further includes control circuitry configured to support at least two redundant groups among the UPSs and to support at least two redundant subgroups among at least one of the redundant groups of UPSs. In this manner, a nested redundancy may be provided.

14 Claims, 7 Drawing Sheets

NESTED REDUNDANT UNINTERRUPTIBLE POWER SUPPLY APPARATUS AND METHODS

RELATED APPLICATION

The present application claims priority from U.S. Provisional Application No. 60/781,102, filed Mar. 10, 2006, the disclosure of which is hereby incorporated herein in its entirety by reference.

BACKGROUND OF THE INVENTION

The present invention relates to uninterruptible power supply (UPS) apparatus and methods and, more particularly, to parallel redundant UPS apparatus and methods.

A variety of different techniques have been used to improve reliability of uninterruptible power supply systems. The techniques include standby redundant, serial redundant, and parallel redundant approaches. A typical standby redundant UPS configuration includes one or more UPS units operating on a stand-by basis, with no load or only a partial load, which can immediately back up a faulty UPS unit by a transfer of the load. A typical serial redundant arrangement involves first and second UPSs connected in a serial fashion wherein, in a first mode of operation, the first UPS is bypassed while the second UPS is serving the load and, in a second mode of operation, the second UPS is bypassed while the first UPS serves the load, such that the first and second UPSs may serve as standby backups for one another.

In a typical parallel redundant arrangement, multiple uninterruptible power supplies (UPSs) are coupled in parallel to a load to provide redundancy and, often, increased load capability. Parallel redundant arrangements of AC power supplies (e.g., UPSs) are described, for example, in U.S. Pat. No. 5,745,357 to Tassitino, Jr. et al., U.S. Pat. No. 6,549,440 to Tassitino, Jr. et al., U.S. Pat. No. 6,803,679 to Luo et al., U.S. Pat. No. 6,118,680 to Wallace et al., U.S. Pat. No. 4,104,539 to Hase, United States Patent Publication No. 2005/0162792 to Wang et al., and United States Patent Publication No. 2005/0073783 to Luo et al.

SUMMARY OF THE INVENTION

In some embodiments of the present invention, an uninterruptible power supply (UPS) system includes at least three UPSs configured to be connected in parallel to a common load. The system further includes control circuitry configured to support at least two redundant groups among the UPSs and to support at least two redundant subgroups among at least one of the redundant groups of UPSs. In this manner, a "nested" redundancy may be provided.

In some embodiments, the control circuitry is configured to provide the at least two redundant subgroups when a loading of the at least one redundant group is less than a predetermined level. The control circuitry may be configured to allow selective enabling and disabling of the UPSs within the redundant group when the loading of the redundant group is less than the predetermined level and to require collective enabling and disabling of the UPSs in the redundant group when the loading of the redundant group is greater than the predetermined level.

In further embodiments of the present invention, respective ones of the redundant groups of UPSs include respective UPS assemblies. Each UPS assembly includes a plurality of UPS modules and a control circuit configured to communicate with the plurality of UPS modules over a first digital communications bus and to communicate with a control circuit of another UPS assembly over a second digital communications bus. The control circuit may include a network bridge between the first and second digital communications busses. Each UPS assembly may further include a bypass circuit, and the control circuit in the UPS assembly may be configured to control the bypass circuit to bypass the UPS modules in the UPS assembly. The UPS modules and control circuit of a UPS assembly may be mounted in and/or on a common frame.

Further embodiments of the present invention provide a UPS assembly including a frame, a plurality of UPS modules mounted in and/or on the frame, a first digital communications bus coupled to each of the UPS modules, and a control circuit mounted in and/or on the frame, coupled to the first digital communications bus and configured to be coupled to a second digital communications bus. The control circuit is operative to communicate AC waveform synchronization information to the UPS modules over the first digital communications bus and to another UPS assembly over the second digital communications bus. The AC waveform synchronization information may include frequency and phase error information. The control circuit may be configured, when the UPS assembly is connected in parallel to a load with the other UPS assembly, to operate the UPS assembly as a redundant backup for the other UPS assembly and to provide at least two redundant subgroups within its plurality of UPS modules.

In some embodiments, the control circuit may be configured to provide the at least two redundant subgroups when a loading of the UPS assembly is less than predetermined level. The control circuit may be configured to allow selective enabling and disabling of the UPS modules when the loading of the UPS assembly is less than the predetermined level and to require collective enabling and disabling of the UPS modules when the loading of the UPS assembly is greater than the predetermined level. The UPS assembly may further include a bypass circuit mounted in and/or on the frame, and the control circuit may be configured to control the bypass circuit to bypass the plurality of UPS modules. The control circuit may include a network bridge between the first and second digital communications busses.

Additional embodiments of the present invention provide methods of operating an uninterruptible power supply (UPS) system. At least three UPSs are connected in parallel to a common load. The at least three UPSs are controlled to support at least two redundant groups among the UPSs and to further support at least two redundant subgroups among at least one of the redundant groups of UPSs. Controlling the at least three UPSs to support at least two redundant groups among the UPSs and to further support at least two redundant subgroups among at least one of the redundant groups of UPSs may include providing the at least two redundant subgroups when a loading of the at least one redundant group is less than a predetermined level. For example, selective enabling and disabling of the UPSs within the at least one redundant group may be allowed when the loading of the at least one redundant group is less than the predetermined level and collective enabling and disabling of the UPSs in the at least one redundant group may be required when the loading of the at least one redundant group is greater than the predetermined level. Respective ones of the redundant groups of UPSs may include respective UPS assemblies, each UPS assembly including a plurality of UPS modules and a control circuit configured to communicate with the UPS modules of the UPS assembly and with a control circuit of another UPS assembly.

DETAILED DESCRIPTION

Figure 1:
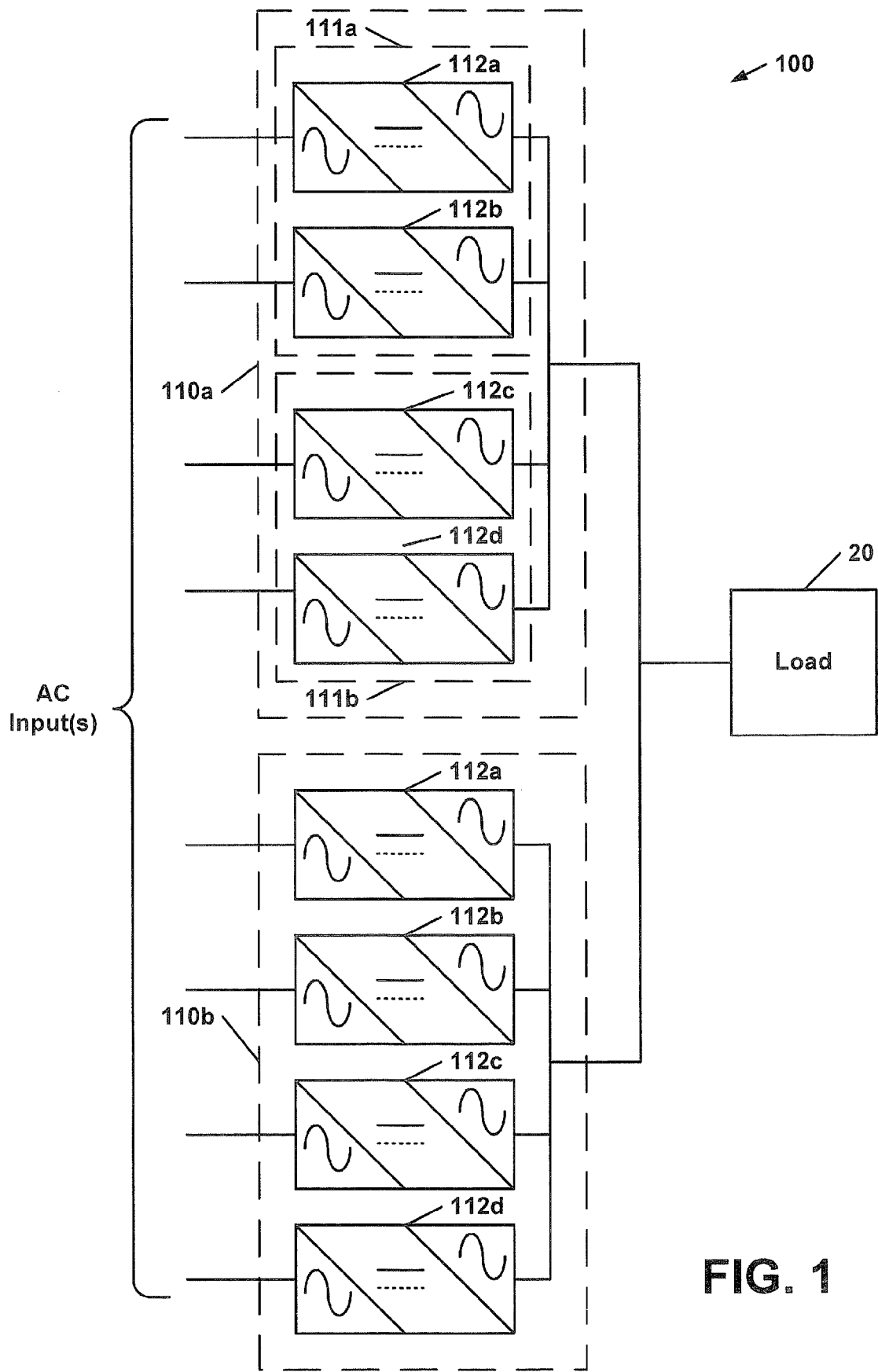
FIG. 1 illustrates a nested redundant UPS system and operations thereof according to some embodiments of the present invention.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular exemplary embodiments illustrated in the accompanying drawings is not intended to be limiting of the invention. In the drawings, like numbers refer to like elements.

As used herein, the singular forms "a", "an" and "the" are intended to include the plural forms as well, unless expressly stated otherwise. It will be further understood that the terms "includes," "includes," "including" and/or "including," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Some embodiments of the present invention arise from a realization that improved reliability in UPS systems may be achieved by using a nested redundant arrangement of UPSs. In some embodiments, a plurality of parallel-connected UPSs is controlled such that at least two redundant groups of the UPSs are provided and, within, at least one of these redundant groups, at least two redundant subgroups of the UPSs are provided. Such an approach may be particularly advantageous in modular UPS configurations. A nested redundant structure may be implemented, for example, using modular UPS assemblies that include respective pluralities of UPS modules and respective control circuits that control the UPS modules and communicate with one another to support nested redundancy.

FIG. 1 illustrates a UPS system 100 according to some embodiments of the present invention. The system 100 includes a plurality of UPSs 112a, 112b, 112c, 112d connected in parallel to a load 20. As shown, the UPSs 112a, 112b, 112c, 112d are "on-line" UPSs, but it will be understood that, in some embodiments of the present invention, "standby," "line interactive" or other configurations may be used. The UPSs 112a, 112b, 112c, 112d are controlled to provide first and second redundant groups 110a, 110b, e.g., the second group 110b may serve as a backup to the first group 110a (and/or vice versa) such that one of the groups 110a, 110b may continue to serve the load 20 in the event of failure of the other of the groups 110a, 110b. It will be appreciated that this redundant operation may be limited to a certain operational envelope, e.g., the redundancy may be limited to cases in which the load 20 is less than a capacity of an individual one of the UPS groups 110a, 110b, and that, when such capacity is exceeded, the UPS groups 110a, 110b may, for example, be collectively disabled and/or bypassed.

Within at least one group 110a there are further defined redundant subgroups 111a, 111b, the first subgroup 111a including two UPSs 112a, 112b and the second subgroup 111b including two UPSs 112c, 112d. Within the group 110a, for example, the first subgroup 111a may serve to backup operation of the second subgroup 111b and/or vice versa.

It will be understood that the groups 110a, 110b and subgroups 111a, 111b are provided for purposes of illustration, and that other redundant groupings and subgroupings may be used in other embodiments of the present invention. For example, in some embodiments, redundant subgroups may be provided in all redundant groups or only in a subset of the redundant groups. In some embodiments, additional redundant groups may be provided to backup the groups 110a, 110b, and these may or may not include redundant subgroups therein. According to further embodiments, an even higher level of nested redundancy may be provided, e.g., some or all of the UPSs 112a, 112b, 112c, 112d may actually include multiple parallel-connected UPSs that are arranged to provide redundant subgroups therein. Other redundancy may also be provided, e.g., some or all of the UPSs 112a, 112b, 112c, 112d may include redundant components, such as redundant rectifiers or inverters. In still further embodiments, redundant groups and/or subgroups may be dynamically redefined depending, for example, on loading and/or disposition (e.g., availability due to maintenance or other events) of particular UPSs.

Figure 2:
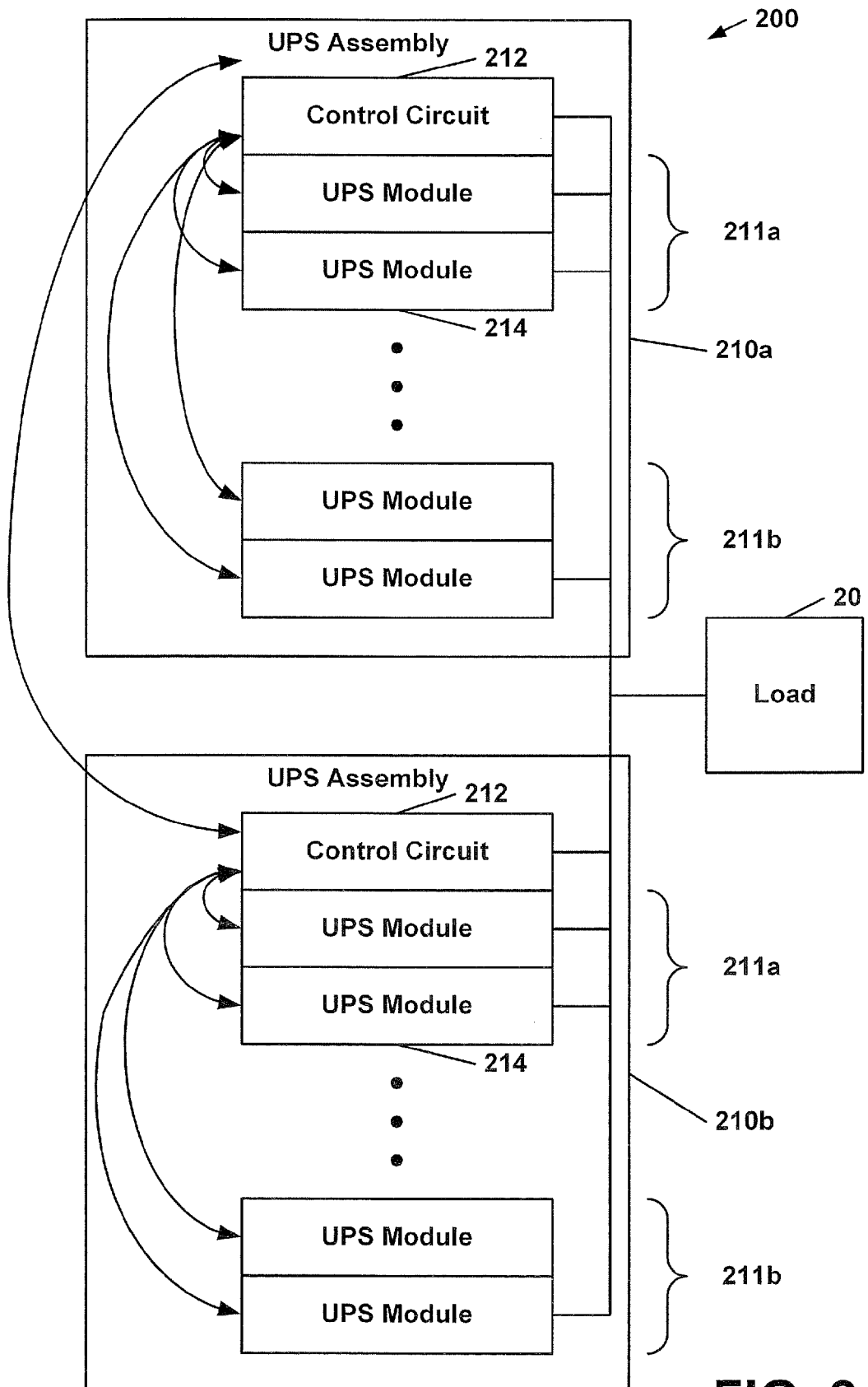
FIG. 2 illustrates a nested redundant UPS system using modular UPS assemblies and operations thereof according to further embodiments of the present invention.

FIG. 2 illustrates a UPS system 200 with a modular architecture according to further embodiments of the present invention. First and second redundant groups of UPSs are provided in the form of respective UPS assemblies 210a, 210b. The UPS assemblies 210a, 210b include respective pluralities of UPS modules 214 that are connected in parallel to a load 20 and that communicate with respective control circuits 212. The control circuits 212 are also configured to communicate with one another. According to embodiments of the present invention, the control circuits 212 and the UPS modules 214 support redundant operation of the UPS assemblies 210a, 210b such that the pluralities of UPS modules 214 therein serve as respective redundant groups of UPSs, e.g., the group of UPS modules 214 of the UPS assembly 210b may act as a group to back up the group of UPS modules 214 of the UPS assembly 210a. Within one or both of the UPS assemblies 210a, 210b, an inner redundancy is provided among the UPS modules 214 thereof. For example, as shown, the modules 214 and control circuit 212 within a UPS assembly may be configured to provide redundant subgroups 211a, 211b within the UPS assembly.

Figure 7:
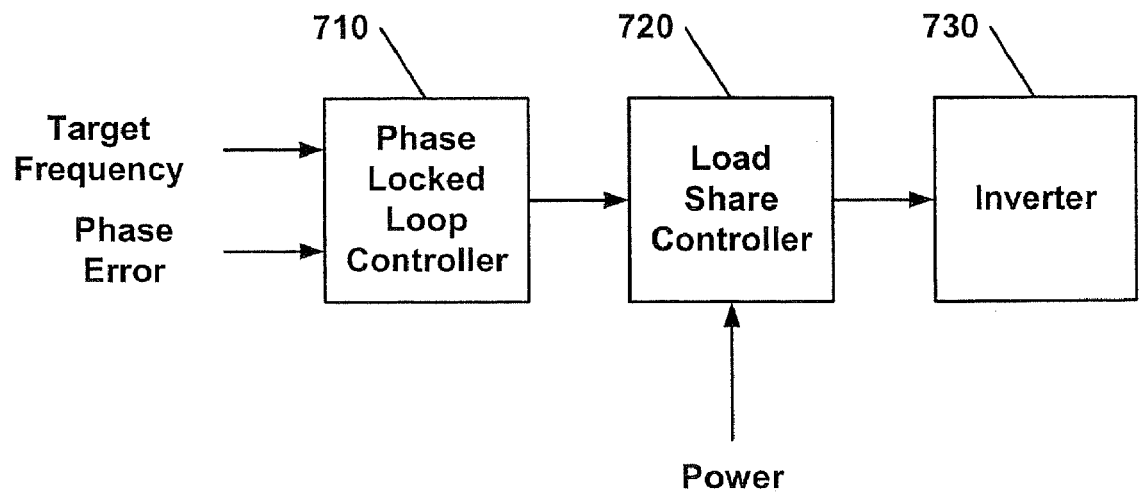
FIGS. 7 and 8 illustrate exemplary UPS module synchronization control architectures according to further embodiments of the present invention.

Such nested redundancy may be achieved using communications among the control circuits 212 and the UPS modules 214. For example, in some embodiments, each UPS module 214 within the first UPS assembly 210a may communicate status information to the associated control circuit 212. Such status information may indicate, for example, whether a failure is imminent in the UPS module 214 and information pertaining the load currently being served by the UPS module 214. In response to such information, the control circuit 212 may determine whether a selective disabling of the UPS module 214 may be allowed such that other UPS modules 214 within the UPS assembly 210a may continue to serve the load 20. For example, as explained in detail with reference to FIG. 7 below, if loading of the UPS assembly 210a is below a certain threshold, it may be possible to let other UPS modules 214 in the UPS assembly 210a to continue to supply power to the load 20. If, however, the loading on the UPS assembly 210a is so high that the remaining operational UPS modules 214 do not have sufficient capacity to serve the load 20, the control law of the control circuit 212 may require collective disabling of all of the UPS modules 214 in the UPS assembly 210a.

The control circuit 210 may further communicate this information to other UPS assemblies, so that they may take coordinated action. For example, in response to receipt of such information from the first UPS assembly 210a, if the control circuit 212 of the second UPS assembly 210b determines that it will not be able to serve the load 20 once the first UPS assembly 210a goes completely off-line, the control law of the control circuit 212 of the second UPS assembly 210b may require collective disabling of all of its currently operational UPS modules 214 as well. This election may be further communicated to the control circuit 212 of the first UPS assembly 212 and/or to other UPS assemblies (not shown) that may be connected to the load 20, so that they may take further actions. For example, if a sufficient number of UPS assemblies are not capable of serving the load 20, they may be collectively bypassed, such that an AC utility or other power source is directly connected to the load 20.

Figure 3:
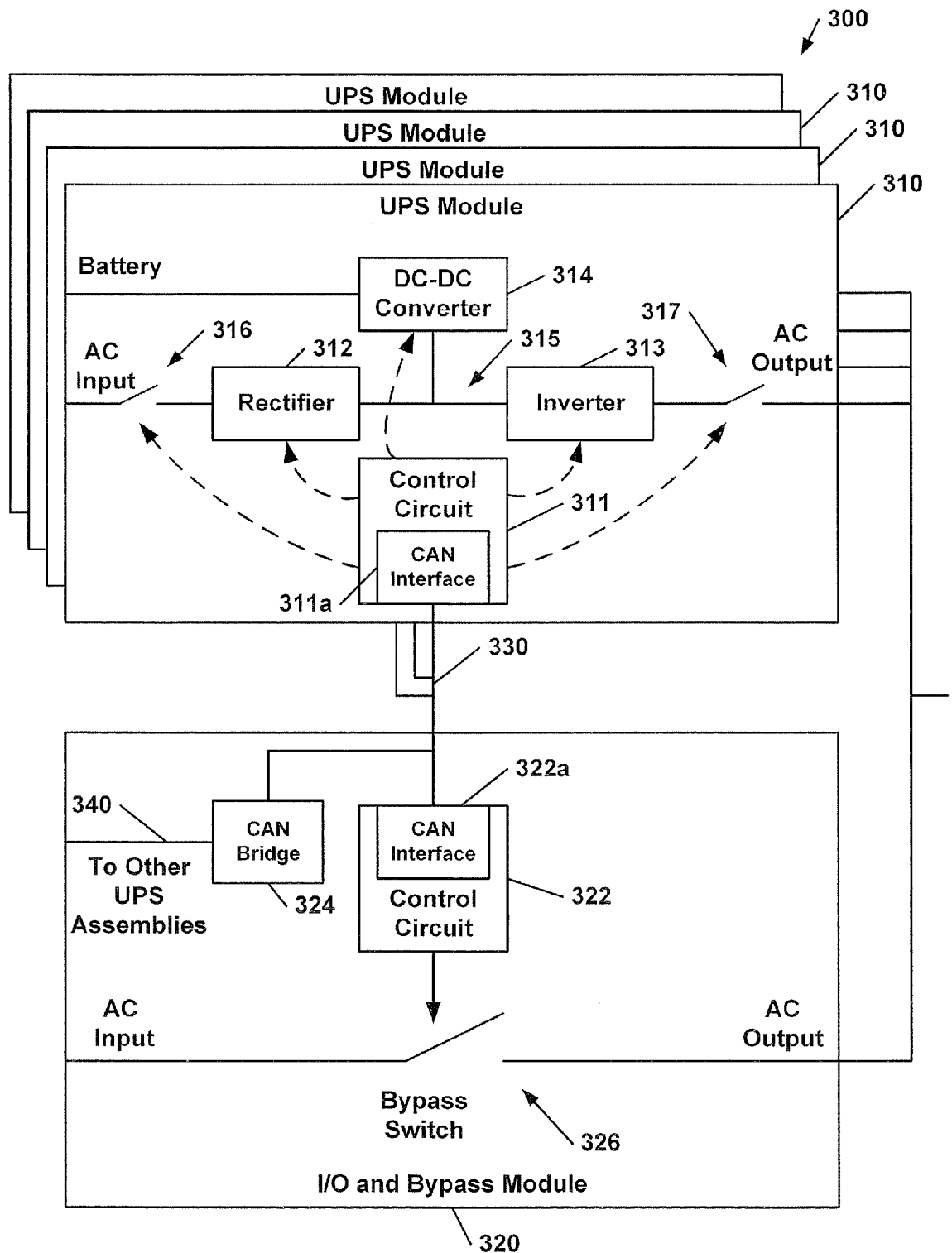
FIGS. 3 and 4 illustrate a modular UPS assembly that may be used in a nested redundant UPS system according to additional embodiments of the present invention.

FIG. 3 illustrates exemplary configurations for a UPS assembly 300 according to some embodiments of the present invention that may be used in a UPS system along the lines described above with reference to FIG. 2. UPS modules 310 include a rectifier 312 configured to receive an AC input via a first switch (e.g., a contactor or relay) 316. An inverter 313 is coupled by a DC bus 315 to the rectifier 312. An output of the inverter 313 may be connected and disconnected from a load (not shown in FIG. 3) via a second switch 317. A DC-DC converter 314 is also coupled to the DC bus 315 and is configured to be connected to a battery (not shown). The DC-DC converter 314 may allow the battery to provide DC power to the DC bus 315 in the absence of AC power at the input of the rectifier 312. The DC-DC converter 314 may also allow charging of the battery from the DC bus 315. A control circuit 311 is configured to control the rectifier 312, inverter 313, DC-DC converter 314 and the switches 316, 316. The control circuit 311 includes a digital communications interface, here shown as a controller area network (CAN) interface 311a, coupled to a digital communications bus 330.

The CAN bus 330 is also coupled to a CAN interface 322a of a control circuit 322 of an I/O and bypass module 320 of the UPS assembly 300. The I/O and bypass module 320 further includes a bypass switch 326 that is configured to bypass the UPS modules 310 responsive to a control signal from the control circuit 322. The I/O and bypass module 320 further includes a CAN bridge 324 that provides communications between the internal communications bus 330 and an external bus 340. Via the CAN bridge 324 and the external bus 340, information may be exchanged with other UPS assemblies.

Figure 4:
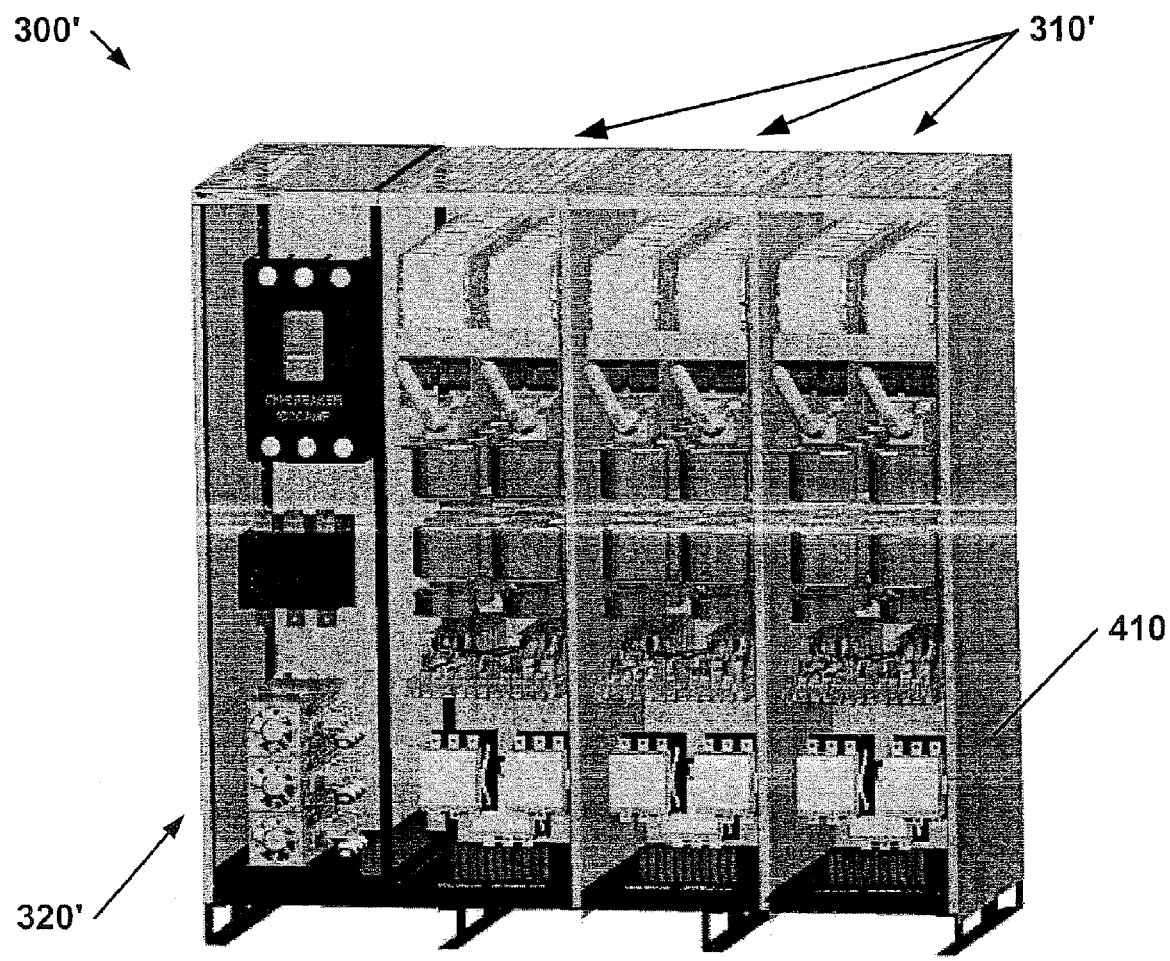

FIG. 4 illustrates an exemplary implementation of a modular UPS assembly 300' having an architecture along the lines of the UPS assembly 300 illustrated in FIG. 3. In the illustrated embodiments, three UPS modules 310' and an I/O and bypass module 320' are mounted in and/or on a common frame, here shown as a cabinet 410. It will be understood that the configuration illustrated in FIG. 4 may be appropriate, for example, to a relatively high capacity UPS system, and that other form factors, including greater or lesser numbers of UPS modules, may be used in other embodiments of the present invention.

Figure 5:
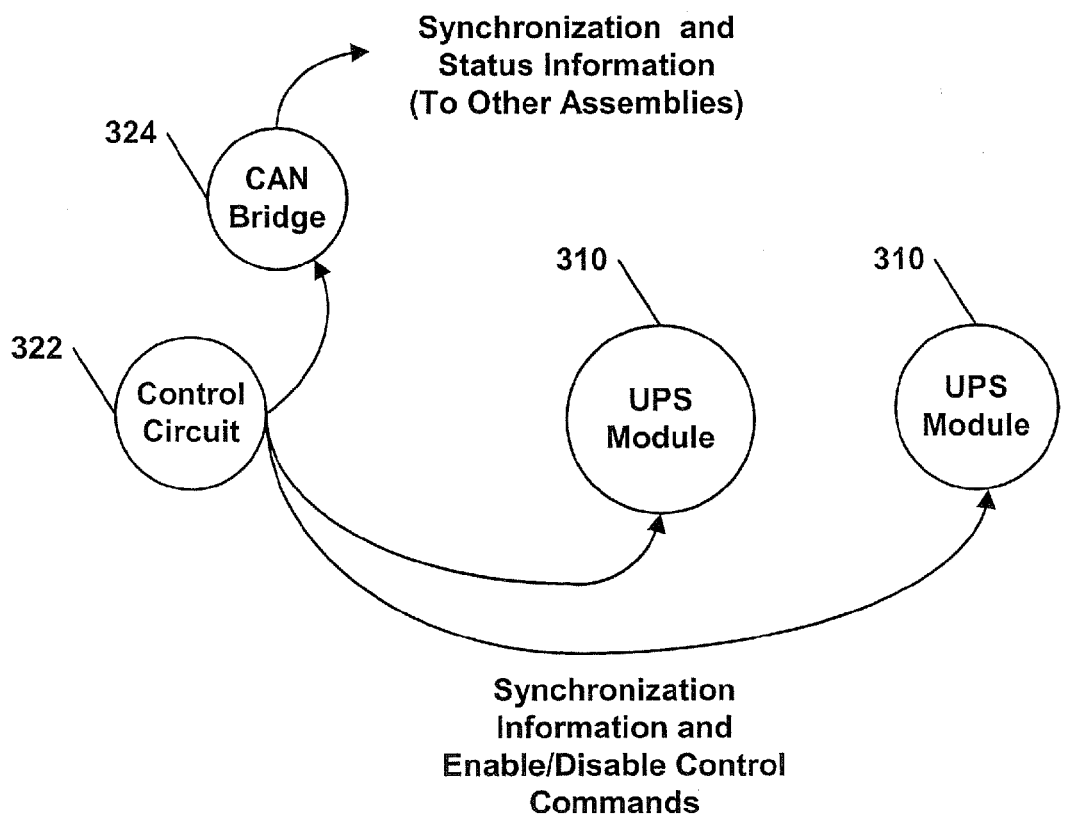
FIGS. 5 and 6 illustrate communications operations of a modular UPS assembly according to some embodiments of the present invention.
Figure 6:
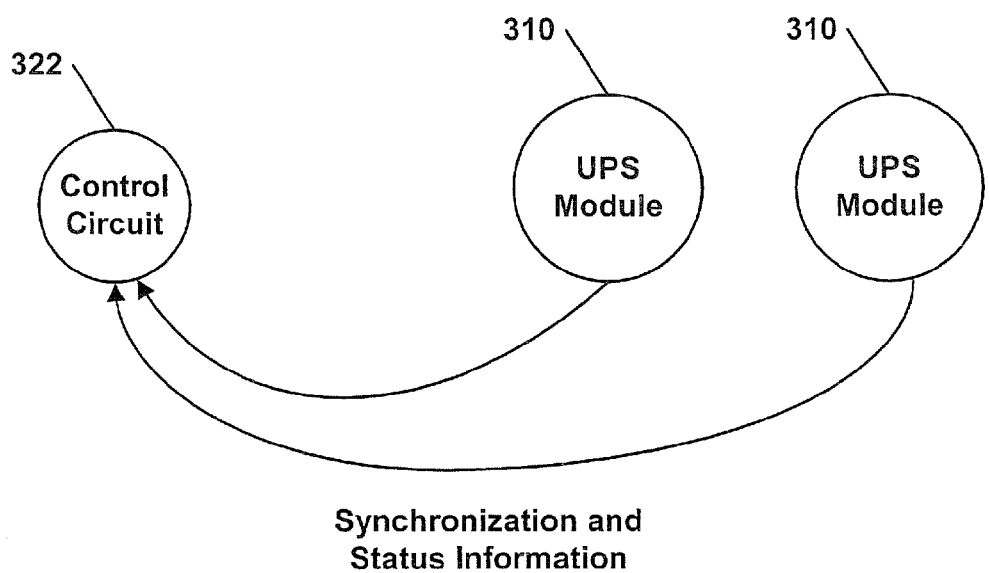

FIGS. 5 and 6 illustrate exemplary signaling that may be used in the modular UPS assembly 300 of FIG. 3. The control circuit 322 of the I/O and bypass module 320 may transmit waveform synchronization information and enable/disable commands to the UPS modules 310 over the internal CAN bus 330. This information may also be transmitted to another UPS assembly external to the UPS assembly 300 via the CAN bridge 324. Referring to FIG. 6, the UPS modules 310 may transmit waveform synchronization information and status information to the control circuit 322 over the internal CAN bus 330. In other embodiments of the present invention, synchronization may be achieved without such explicit signaling, for example, by using techniques along lined described in U.S. Pat. No. 5,745,355 to Tracy et al. and U.S. Pat. No. 5,745,356 to Tassitino, Jr. et al, the contents of each of which is incorporated by reference herein in their entireties.

Figure 8:
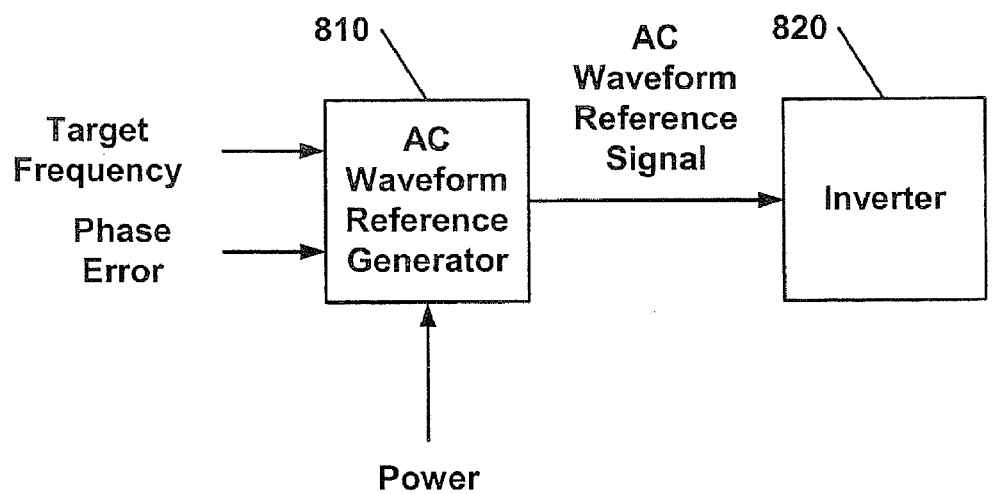

According to some embodiments of the present invention, the waveform synchronization information may include frequency and phase error information that may be used by the modules 310 to synchronize operation of their inverters 313. For example, referring to FIG. 7, synchronization information transmitted to a control circuit of a UPS module, such as the UPS modules 310 of FIG. 3, may include a target frequency and phase error that are passed to a phase locked loop controller 710 that generates a reference signal for an inverter driver 730 of the module. As shown, for purposes of balancing load share among modules, the phase lock loop compensation may be augmented by a load share controller 720 that operates responsive to a measure of power output of the module, along lines, for example, described in U.S. Pat. No. 6,549,440 to Tassitino et al., the disclosure of which is hereby incorporated by reference herein in its entirety. As shown in FIG. 8, in some embodiments, the phase locked loop and load share control functions shown in FIG. 7 may be implemented in an AC waveform reference generator 810 that generates an AC waveform reference signal for an inverter driver 820.

Figure 9:
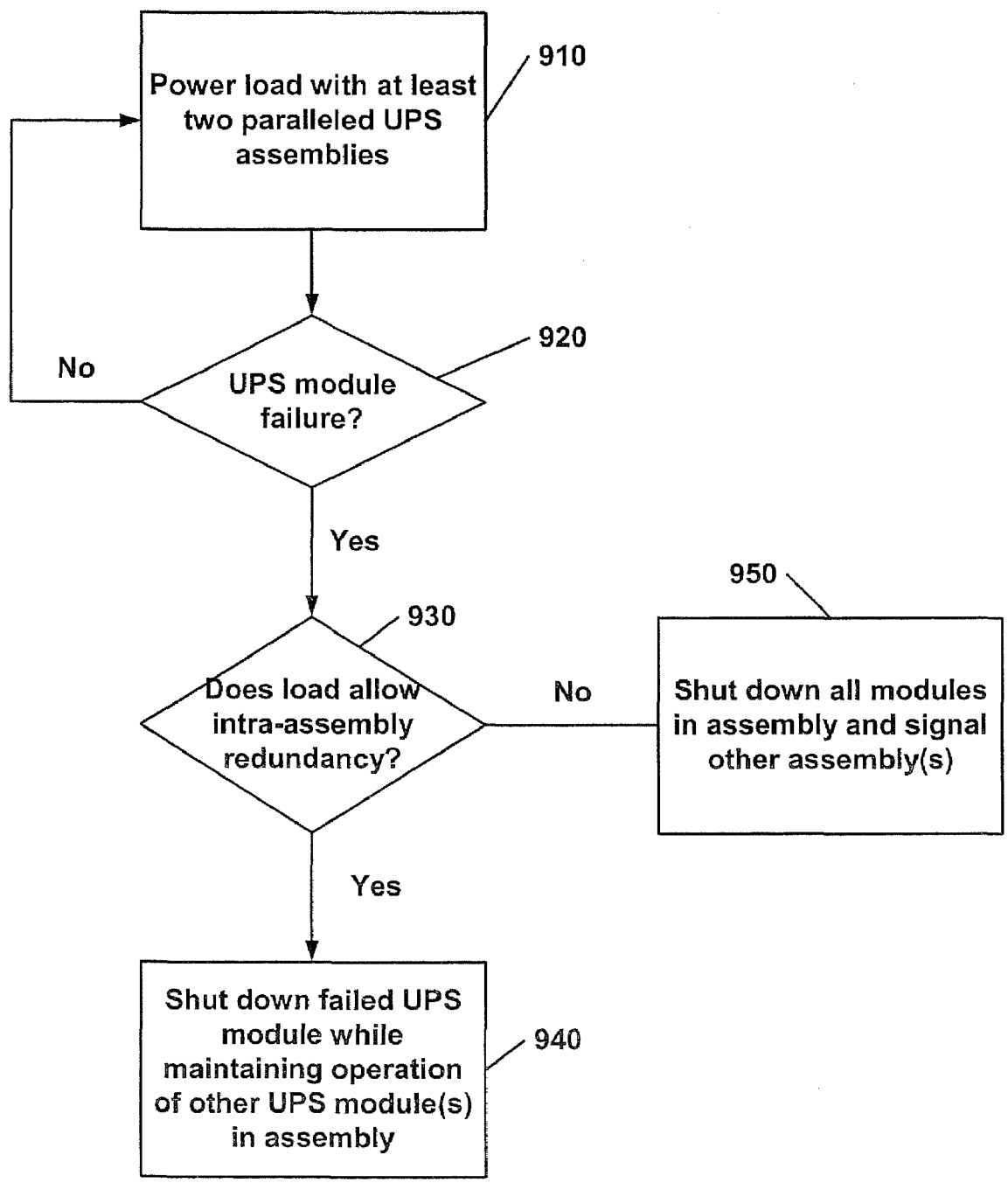
FIG. 9 is a flowchart illustrating operations for nested redundant operation of a UPS system according to further embodiments of the present invention.

FIG. 9 illustrates exemplary UPS operations for nested redundant operation of a UPS assembly according to further embodiments of the present invention. A load is powered by at least two parallel UPS assemblies, e.g., modular UPS assemblies such as the assemblies 300, 300' of FIGS. 3 and 4 (block 910). Upon detection of a failure of a UPS module in a first one of the UPS assemblies (block 920), the control circuit of the first UPS assembly determines whether the level of loading allows for intra-assembly redundancy, i.e., will allow remaining operative UPS modules in the assembly to continue supplying the load (block 930). If the load is sufficiently low, the control circuit may disable the failed module, and allow the remaining modules to continue to drive the load (block 940), thus providing intra-assembly redundancy. It will be understood that a second module mail fail in a second one of the UPS assemblies, which may lead to disabling of that second module without requiring changes to the operation of the first UPS assembly. If insufficient capacity exists, however, the control circuit collectively disables all of the modules in the assembly and signals another assembly to inform it of the collective shutdown (block 950). In further embodiments of the present invention, other operations may be performed. For example, in some embodiments, dynamic redefinition of redundant groups and/or subgroups may occur in response to shutdown or other unavailability of particular modules.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed is:

1. An uninterruptible power supply (UPS) system, comprising:
    at least three UPSs configured to be connected in parallel to a common load; and
    control circuitry configured to support at least two redundant groups among the UPSs and to support at least two redundant subgroups among at least one of the redundant groups of UPSs, wherein the control circuitry is configured to determine a loading of a first redundant group when concurrently providing power to the load with a second redundant group, to allow selective enabling and disabling of the UPSs within the first redundant group when the determined loading of the first redundant group is less than a predetermined level, to collectively disable the UPSs in the first redundant group when the determined loading of the first redundant group is greater than the predetermined level, and to allow the second redundant group to continue providing power to the load after collectively disabling the UPSs in the first redundant group.

2. The system of claim 1, wherein respective ones of the at least two redundant groups of UPSs comprise respective UPS assemblies, each UPS assembly comprising a plurality of UPS modules and a control circuit configured to communicate with the plurality of UPS modules over a first digital communications bus and with a control circuit of another UPS assembly over a second digital communications bus.

3. The system of claim 2, wherein the control circuit comprises a network bridge between the first and second digital communications busses.

4. The system of claim 2, wherein each UPS assembly further comprises a bypass circuit, and wherein the control circuit in the UPS assembly is configured to control the bypass circuit to bypass the UPS modules in the UPS assembly.

5. The system of claim 2, wherein the plurality of UPS modules and control circuit of a UPS assembly are mounted in and/or on a common frame.

6. The system of claim 5, wherein the UPS assembly further comprises a bypass circuit mounted in and/or on the common frame, and wherein the control circuit is configured to control the bypass circuit to bypass the UPS modules.

7. A UPS assembly, comprising:
    a frame;
    a plurality of UPS modules mounted in and/or on the frame;
    an first digital communications bus coupled to each of the UPS modules; and
    a control circuit mounted in and/or on the frame, coupled to the first digital communications bus and configured to be coupled to a second digital communications bus, the control circuit operative to communicate AC waveform synchronization information to the UPS modules over the first digital communications bus and to another UPS assembly over the second digital communications bus, wherein the control circuit is configured, when the UPS assembly is connected in parallel to a load with another UPS assembly, to operate the UPS assembly as a redundant backup for the other UPS assembly and to provide at least two redundant subgroups within its plurality of UPS modules, and wherein the control circuit is configured to determine a loading of the UPS assembly when it is concurrently providing power to the load with the other UPS assembly, to allow selective enabling and disabling of the UPS modules when the loading of the UPS assembly is less than a predetermined level, to collectively disable the UPS modules when the loading of the UPS assembly is greater than the predetermined level and to communicate information regarding the collective disabling to the other UPS assembly.

8. The UPS assembly of claim 7, wherein the AC waveform synchronization information comprises frequency and phase error information.

9. The UPS assembly of claim 7, further comprising a bypass circuit mounted in and/or on the frame and wherein the control circuit is configured to control the bypass circuit to bypass the plurality of UPS modules.

10. The UPS assembly of claim 7, wherein the control circuit comprises a network bridge between the first and second digital communications busses.

11. The UPS assembly of claim 7, wherein the first digital communications bus comprises a controller area network (CAN) bus.

12. A method of operating an uninterruptible power supply (UPS) system, comprising:
    connecting at least three UPSs in parallel to a common load; and
    controlling the at least three UPSs to support at least two redundant groups among the UPSs and to support at least two redundant subgroups among at least one of the redundant groups of UPSs, wherein controlling the at least three UPSs comprises:
        determining a loading of a first redundant group when it is concurrently providing power to the load with a second redundant group;
        allowing selective enabling and disabling of the UPSs within the first redundant group when the determined loading of the first redundant group is less than a predetermined level;
        collectively disabling the UPSs in the first redundant group when the loading of the first redundant group is greater than the predetermined level; and
        continuing to provide power to the load from the second redundant group after the collective disabling.

13. The method of claim 12, wherein respective ones of the at least two redundant groups of UPSs comprise respective UPS assemblies, each UPS assembly comprising a plurality of UPS modules and a control circuit configured to communicate with the UPS modules of the UPS assembly and with a control circuit of another UPS assembly.

14. The method of claim 13, wherein the UPS modules and control circuit of a UPS assembly are mounted in and/or on a common frame.

* * * * *